Dec. 6, 1949  M. S. DUNKELBERGER  2,490,584
FISHING ROD HANDLE AND REEL LOCK
Filed Aug. 20, 1945

Inventor
Milton S. Dunkelberger
By Henry G. Dyking
His Attorney

Patented Dec. 6, 1949

2,490,584

UNITED STATES PATENT OFFICE 2,490,584

FISHING-ROD HANDLE AND REEL LOCK

Milton S. Dunkelberger, Dayton, Ohio, assignor to The American Display Company, Dayton, Ohio, a corporation of Ohio Application August 20, 1945, Serial No. 611,570

1 Claim. (Cl. 43—22)

This invention relates to a rod and reel assembly and more particularly to the mechanism for attaching the reel to the rod.

Many makes of fishing rods are provided with a portion adapted to support a reel removably attached. When packing the fishing rod or utilizing the fishing rod for some other type of fishing, the reel may be removed. When attaching the reel it is secured in position in various manners, depending upon the type and make of fishing rod. A great deal of difficulty has been encountered in locking the reel in position, in that even though the reel may appear to be absolutely rigid when used in casting, the reel seems to work loose.

An object of this invention is to provide attaching mechanism for rigidly attaching a reel to a rod, which attaching mechanism will not permit the reel to jar loose although the reel is removably mounted.

Another object of this invention is to provide attaching mechanism for removably attaching a reel to a rod, which mechanism is strong, dependable and cheaply produced.

Other objects and advantages reside in the construction of parts, the combination thereof and the mode of operation, which will become more apparent from the following description.

Referring to the drawings, Figure 1 is a side elevational view showing a portion of the rod, the handle, the reel and the mechanism for attaching the reel to the rod.

Figure 2 is a longitudinal fragmentary cross sectional view of the assembly shown in Figure 1.

Figure 3 discloses the locking member as it appears when removed from the assembly.

Figure 1:
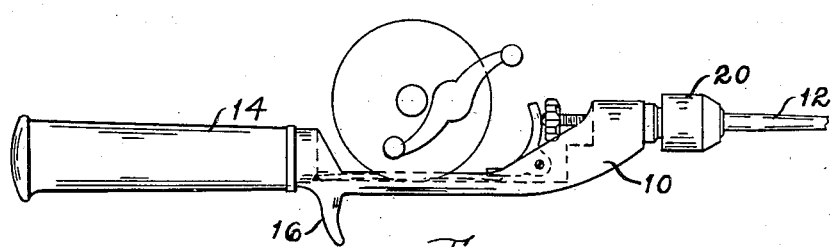

In the drawings, the reference character 10 indicates the reel-supporting portion of the handle of a fishing rod 12. Member 10 has mounted thereon a hand-grip portion 14 and an index finger-gripping member 16. Member 10 is provided with a threaded aperture receiving the shank 18 threadedly supporting a chuck 20, used in clamping the rod 12 in position. The reel-supporting portion 10 is provided with a reel seat terminating in an undercut groove 22 receiving the end 24 of a reel-bridging member 26 that supports a reel assembly 28. The forward end of the reel seat supports a pivotally mounted, substantially L-shaped bracket 30, pivoted at 32 to member 10. The horizontally disposed portion 30a of member 30, as viewed in Figure 2, engages the forward end of reel-bridging member 26, and is tightened against this member by a screw 34, threadedly engaging the shank 18.

Figure 2:
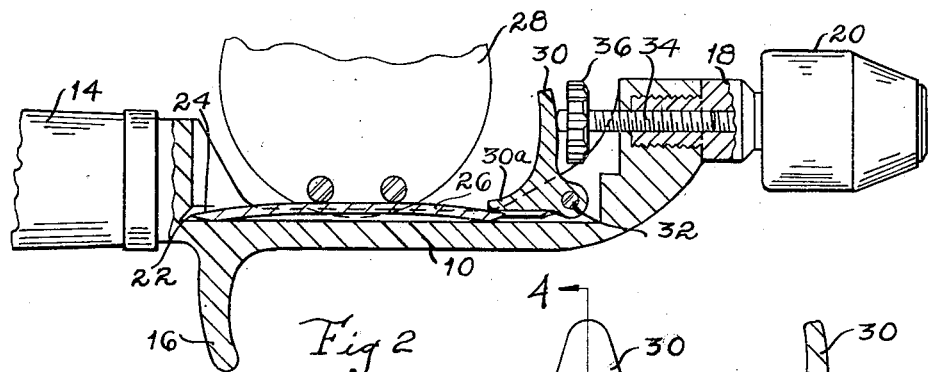
Figures 5, 6:
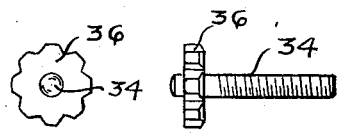
Figure 5 is a side elevational view of the screw used in holding the reel in locked position.
Figure 6 is an end elevational view of the screw shown in Figure 5 as viewed from the left of Figure 5.
Figures 3, 4:
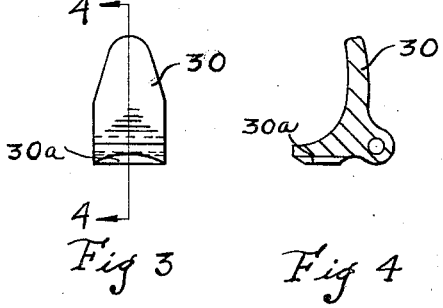
Figure 4 is a cross sectional view taken substantially on the line 4—4 of Figure 3.

By manually rotating the knurled head 36 of the screw 34, so as to rotate the L-shaped bracket 30 in a counter-clockwise direction, as viewed in Figure 2, sufficient pressure is exerted upon the forward end of the screw 34 so as to hold this in position. The screw 34 engages the bracket 30 at a point further removed from the pivot 32 than is the point of contact of the bracket 30 engaging the reel-bridging member 26. By this arrangement the screw exerts effective leverage upon the reel-supporting member 26, to rigidly clamp this member in position.

When it is found desirable to remove the reel, it is merely necessary to adjust the screw 34 to release the force exerted against the bracket 30, permitting the bracket 30 to oscillate about the pivot 32, as viewed in Figure 2, to release the reel-bridging member 26 that may then be actuated towards the hand-grip portion 14, so as to permit the other end of the reel-bridging member 26 to clear the bracket 30.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

An attachment for clamping a reel support in position upon the reel-supporting portion of a handle assembly for a fishing rod, said reel-supporting portion underlying the reel support, said attachment including an L-shaped bracket pivotally mounted in the reel supporting portion and having one leg extending in a direction substantially parallel to the reel support and overlying the end thereof, the other leg of the L-shaped bracket extending upwardly in a direction substantially normal to the reel support, said other leg being considerably longer than the overlying leg, said reel supporting portion terminating in an upwardly directed portion provided with a threaded aperture, a chuck supporting shank having a tubular portion provided with both external and internal threads, the external threads engaging the threaded aperture, the longitudinal axis of the shank being aligned with the rod, an adjusting screw threadedly engaging the internal threads of the internal portion of the shank, said screw axially engaging the upwardly directed leg of the L-shaped bracket so as to clamp the end of the reel support between the overlying leg and the reel supporting portion of the handle assembly.

MILTON S. DUNKELBERGER.

REFERENCES CITED

The following references are of record in the file of this patent:

UNITED STATES PATENTS

| Number | Name | Date |
|---|---|---|
| 464,901 | Sheets | Dec. 8, 1891 |
| 680,757 | Braucht | Aug. 20, 1901 |
| 1,591,122 | Gephart | July 6, 1926 |
| 1,785,027 | Gephart | Dec. 16, 1930 |
| 1,898,323 | Teetor | Feb. 21, 1933 |
| 2,421,240 | Camburn | May 27, 1947 |